US012580201B2

(12) United States Patent
Chae et al.

(10) Patent No.: US 12,580,201 B2

(45) Date of Patent: Mar. 17, 2026

(54) ELECTRODE HAVING HIGH OXYGEN PERMEABILITY FOR FUEL CELL AND MEMBRANE-ELECTRODE ASSEMBLY COMPRISING SAME

(71) Applicants: Hyundai Motor Company, Seoul (KR); Kia Motors Corporation, Seoul (KR)

(72) Inventors: Il Seok Chae, Seoul (KR); Bo Ki Hong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 514 days.

(21) Appl. No.: 17/121,159

(22) Filed: Dec. 14, 2020

(65) Prior Publication Data

US 2022/0021006 A1 Jan. 20, 2022

(30) Foreign Application Priority Data

Jul. 20, 2020 (KR) ........................ 10-2020-0089722

(51) Int. Cl.

| | |
|---|---|
| ***H01M 4/86*** | (2006.01) |
| ***C08G 67/00*** | (2006.01) |
| ***C08L 65/00*** | (2006.01) |
| ***C08L 73/00*** | (2006.01) |
| ***H01M 4/88*** | (2006.01) |
| ***H01M 4/90*** | (2006.01) |
| ***H01M 8/1004*** | (2016.01) |

(52) U.S. Cl.

CPC .......... *H01M 4/8668* (2013.01); *C08G 67/00* (2013.01); *C08L 65/00* (2013.01); *C08L 73/00* (2013.01); *H01M 4/8605* (2013.01); *H01M 4/8828* (2013.01); *H01M 4/9041* (2013.01); *H01M 4/9075* (2013.01); *H01M 8/1004* (2013.01); *C08L 2205/14* (2013.01); *H01M 2250/20* (2013.01)

(58) Field of Classification Search

None

See application file for complete search history.

(56) References Cited

U.S. PATENT DOCUMENTS

| | | | | |
|---|---|---|---|---|
| 8,227,135 B2 | | 7/2012 | Li et al. | |
| 2016/0285116 A1 | * | 9/2016 | Yang .................. | H01M 8/1004 |

FOREIGN PATENT DOCUMENTS

| | | | | |
|---|---|---|---|---|
| CN | 107112524 | * | 8/2017 | ............ H01M 4/505 |
| JP | 2003-317721 | * | 11/2003 | ............. H01M 4/62 |
| JP | 2013-216811 A | | 10/2013 | |

(Continued)

OTHER PUBLICATIONS

Machine-generated translation of JP 2003-317721 (see description above).*

(Continued)

*Primary Examiner* — Raymond Alejandro

(74) *Attorney, Agent, or Firm* — Fox Rothschild LLP

(57) ABSTRACT

Disclosed are an electrode for a fuel cell a membrane-electrode assembly including the same, and a method of preparing the same. The electrode may include catalyst particles; and a binder in which the catalyst particles are dispersed. In particular, the binder may include an ionomer having proton conductivity and a polymer of intrinsic microporosity (PIM) in order to implement high oxygen permeability.

17 Claims, 5 Drawing Sheets

(56) References Cited

FOREIGN PATENT DOCUMENTS

| | | | |
|---|---|---|---|
| JP | 2014-216157 | A | 11/2014 |
| KR | 101432725 | B1 | 8/2014 |
| KR | 101485867 | B1 | 1/2015 |
| KR | 2015-0065225 | A | 6/2015 |

OTHER PUBLICATIONS

Machine-generated translation of 107112524 (see description above).*
Machine-generated translation of CN 110832678, Si et al., “Secondary Battery, Battery Pack, An Electric Vehicle, An Electric Power Storage System, Electric Tool And Electronic Device”, Feb. 21, 2020.*
A. Kongkanand et al., J. Phys. Chem. Lett. 2016, 7, 7, 1127-1137.
A. Rolfi et al., J. Power Sources, 2018, 396, 95-101.
B. G. Kim et al., Macromol. Res. 2014, 22, 1, 92-98.
M. Galizia et al., Macromolecules 2017, 50, 20, 7809-7843.
N. B. McKeown, ISRN Materials Science, vol. 2012, Article ID 513986, 16 pages, 2012.
K. A. Mauritz et al., Chem. Rev., 2004, 104, 4535.
Z. Dai et al., Sep. Purif. Technol., 2019, 214, 67-77.
Liu et al., Mixed matrix formulations with MOF molecular sieving for key energy-intensive separations, nature materials, 2018.
Afarani et al., The Gas Separation Performance of Polyurethane-Zeolite Mixed Matrix Membranes, Advances in Polymer Technology, vol. 37, No. 2, 2018.

* cited by examiner

ELECTRODE HAVING HIGH OXYGEN PERMEABILITY FOR FUEL CELL AND MEMBRANE-ELECTRODE ASSEMBLY COMPRISING SAME

CROSS REFERENCE TO RELATED APPLICATION

The present application claims priority based on Korean Patent Application No. 10-2020-0089722, filed on Jul. 20, 2020, the entire content of which is incorporated herein for all purposes by this reference.

TECHNICAL FIELD

The present invention relates to an electrode for a fuel cell, containing a polymer of intrinsic microporosity (PIM) in order to realize high oxygen permeability, and a membrane-electrode assembly including the same.

BACKGROUND

An electrode for a proton-exchange membrane fuel cell (PEMFC) is composed of a catalyst such as platinum and an ionomer serving as a binder. Since a catalyst such as platinum is expensive, it is required to reduce the use thereof, but the amount of the catalyst that is used is a key variable that has a decisive effect on the performance of fuel cells. In general, reducing the amount of the catalyst that is used degrades cell performance. The problem with existing electrodes occurs because a Nafion ionomer, serving as a binder, blocks the pores and thus the diffusion rate of oxygen significantly decreases.

Conventional attempts have been made to design a solid polymer electrolyte capable of increasing the free volume of a polymer in order to improve the diffusion rate of oxygen in the electrode. For example, a method of using a perfluorodioxole structure into an existing perfluorinated ionomer structure has been reported for the molecular design of a cathode catalyst layer binder having high oxygen permeability. Using such a hydrophobic asymmetric ring structure may interfere with the formation of crystals in the polymer main chain to thus obtain an amorphous perfluorinated ionomer. This is based on the principle of lowering the oxygen permeation resistance by ensuring a relatively high free volume compared to a crystalline perfluorinated ionomer.

Moreover, an oxygen-permeable electrode binder having a relatively high free volume by preventing pi-pi stacking has been reported. The binder included several kinds of substituents into proton-conductive polymers composed of phosphazene inorganic monomers including organic aromatic molecules. The binder thus developed exhibits high oxygen permeability compared to Nafion at a temperature equal to or higher than the glass transition temperature.

Further, a highly oxygen-permeable binder including an acidic group such as a sulfonation group into a polymer of intrinsic porosity has been reported that it had a high free volume and exhibited oxygen permeability 2,000 times greater than that of Nafion. However, that binder did not provide high oxygen permeability because the introduction of the sulfonation group decreased the molecular weight of the polymer and also undesirably degraded the properties as the binder.

These studies have a problem in that the appropriate molecular weight of the polymer has not been satisfied, and thus have limitations from the aspects of forming a free volume and increasing oxygen permeability. Recently, in order to improve gas permeability, a mixed matrix membrane (MMM) strategy in which a porous nanomaterial such as zeolite or a metal organic framework (MOF) has been added to a polymer matrix has been attempted. As such, gas permeability has been increased by reducing the mass transfer resistance and by increasing the total free volume of the matrix due to addition of the porous material to the matrix having a relatively low free volume due to the thermal movement of the segment of the polymer. However, this strategy also has many limitations due to the problem of dispersion of the inorganic porous material and compatibility with the polymer matrix.

SUMMARY

In one preferred aspect, provided is an electrode for a fuel cell having high oxygen permeability.

In one preferred aspect, provided is an electrode for a fuel cell in which the use of a catalyst is reduced due to improved oxygen permeability.

The objectives of the present invention are not limited to the foregoing, and will be able to be clearly understood through the following description and to be realized by the means described in the claims and combinations thereof.

In an aspect, provided is an electrode for a fuel cell, which may include: catalyst particles; and a binder in which the catalyst particles are dispersed. Preferably, the binder may include an ionomer and a polymer of intrinsic microporosity (PIM). In preferred aspects, the bind comprises an ionomer having proton conductivity.

The term “binder”, as used herein, refers to a resin or a polymeric material that can be polymerized or cured to form a polymeric matrix. The binder may be cured (polymerized) or partially cured upon curing process such as heating, UV radiation, electron beaming, chemical polymerization using additives and the like. In certain embodiments, the binder may be polymerized or cured by heat-treatment.

The term “ionomer” as used herein refers to a polymeric material or resin that includes ionized groups attached (e.g. covalently bonded) to the backbone of the polymer as pendant groups. Preferably, such ionized groups may be functionalized to have ionic characteristics, e.g., cationic or anionic.

The ionomer may suitably include one or more polymers selected from the group consisting of a fluoro-based polymer, a perfluorosulfone-based polymer, a benzimidazole-based polymer, a polyimide-based polymer, a polyetherimide-based polymer, a polyphenylene sulfide-based polymer, a polysulfone-based polymer, a polyethersulfone-based polymer, a polyetherketone-based polymer, a polyether-etherketone-based polymer, a polyphenylquinoxaline-based polymer and a polystyrene-based polymer.

The term “polymer of intrinsic microporosity (PIM)” as used herein refers to a polymer or resin component that includes a network of interconnected intermolecular spaces or pores preferably having size less than 20 nm (cf. Micropores are defined by IUPAC as pores with a diameter less than 20 nm. Ref: M. Thommes, K. Kaneko, A. V. Neimark, J. P. Olivier, F. Rodriguez-Reinoso, J. Rouquerol, K. S. W. Sing, Physisorption of gases, with special reference to the evaluation of surface area and pore size distribution (IUPAC Technical Report), Pure Appl. Chem., 87 (2015), pp. 1051-1069, 10.1515/pac-2014-1117), which is measured by maximum distance between the two points of the intermolecular spaces or pores. Certain embodiments, the size of the intermolecular spaces or pores may range from about 1 nm to about 5 nm, from about 1 nm to about 3 nm, or from about 1.5 nm to about 2 nm.

The catalyst particles may preferably include a catalyst metal supported on a support.

The ionomer may suitably include a perfluorinated sulfonic acid polymer.

The polymer of intrinsic microporosity may suitably have the shape of a spiral structure.

The polymer of intrinsic microporosity may be represented by Chemical Formula 1 below.

[Chemical Formula 1]

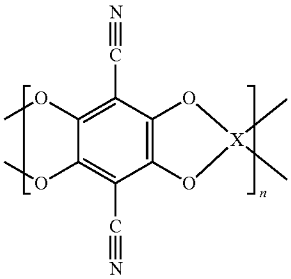

where n is a positive integer such as from 1 to 10.

Each X may independently be selected from:

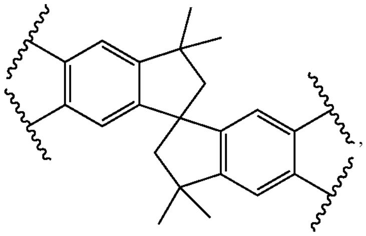
,

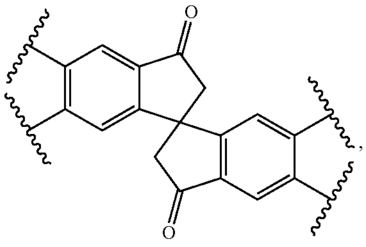
,

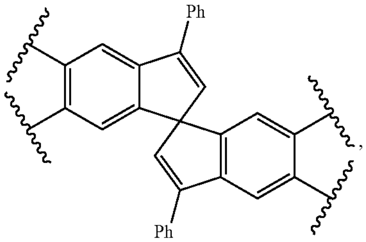
,

-continued

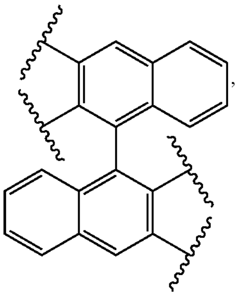
,

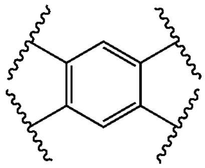
,

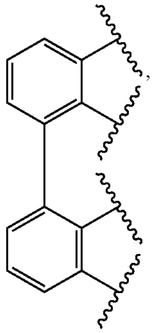
,

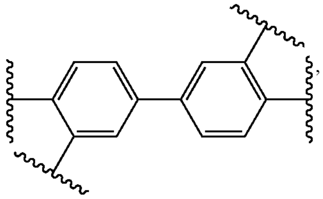
,

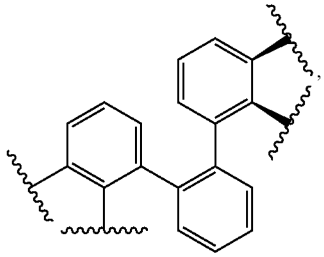
,

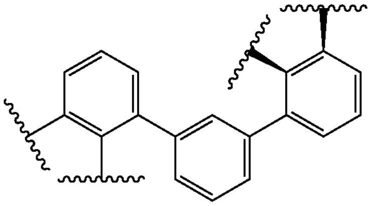
,

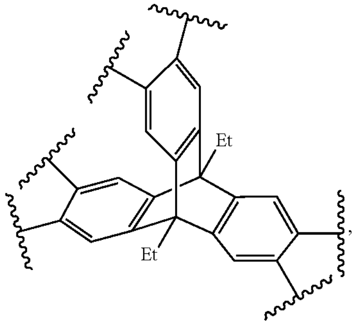
,

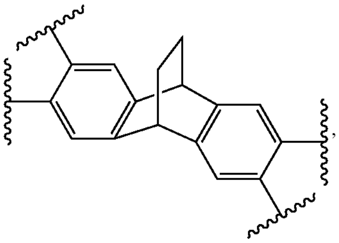
,

-continued

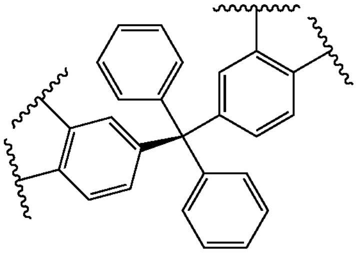,

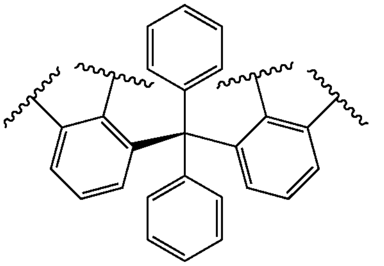 and

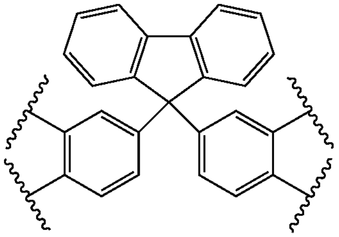.

The polymer of intrinsic microporosity may have a weight average molecular weight of about 5,000 g/mol or less.

The binder may include the polymer of intrinsic microporosity in an amount of about 1 wt % to 20 wt % based on the total weight of the binder.

The electrode may have oxygen permeability of about 0.6 barrer to 36 barrer.

In an aspect, provided is a method of manufacturing an electrode for a fuel cell, which may include: preparing a polymer of intrinsic microporosity; preparing an admixture including the polymer of intrinsic microporosity in an organic solvent; preparing a binder including the admixture and an ionomer; preparing a slurry including the binder and catalyst particles; and forming an electrode by applying the slurry on a substrate.

The polymer of intrinsic microporosity may be prepared through condensation of a monomer A represented by Chemical Formula 2 below and a monomer B represented by Chemical Formula 3 below.

[Chemical Formula 2]

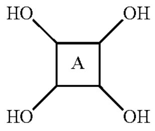

Each A may independently b selected from:

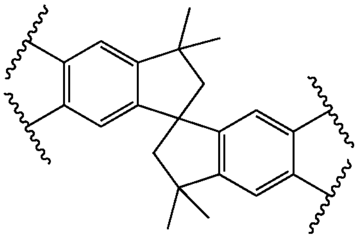,

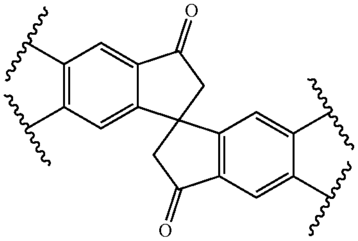,

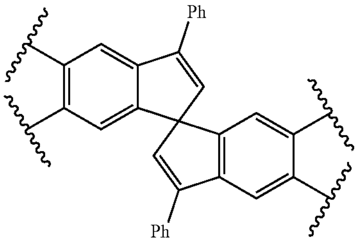,

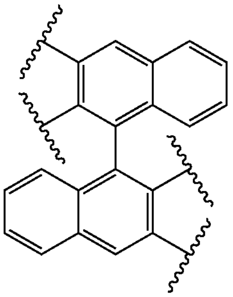, 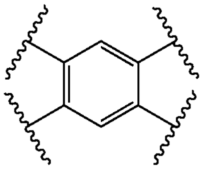,

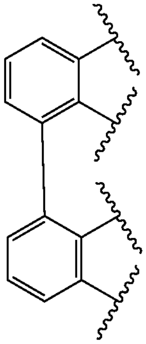, 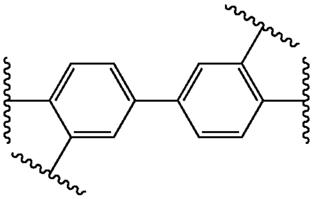,

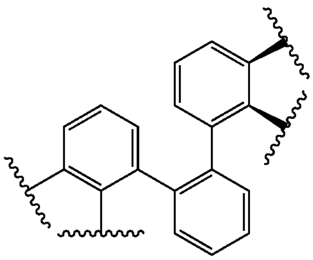,

-continued

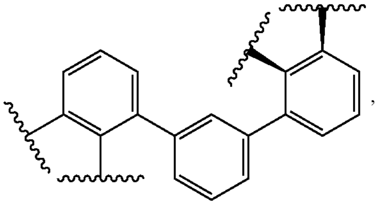

,

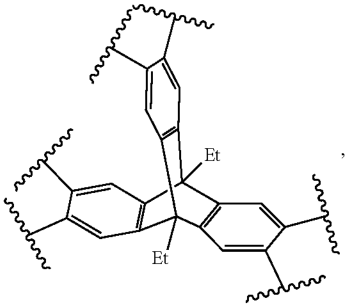

,

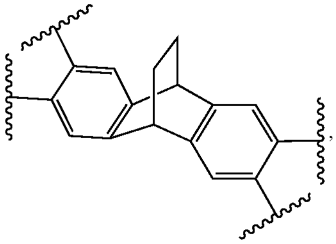

,

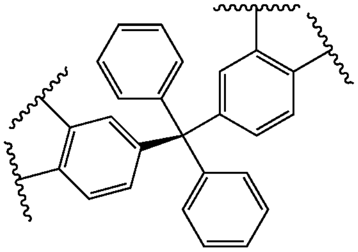

,

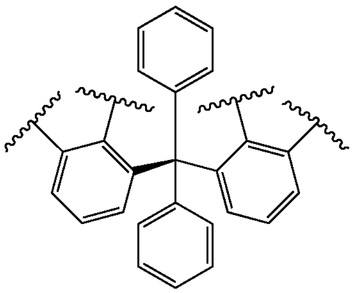

and

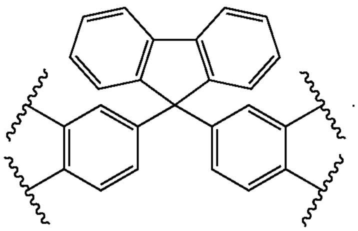

.

-continued

[Chemical Formula 3]

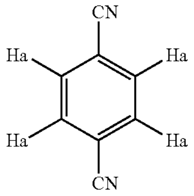

Ha may independently be F, Cl, Br or I.

The polymer of intrinsic microporosity may suitably include 5,5',6,6'-tetrahydroxy-3,3,3',3'-tetramethylspirobisindane (SBI), 2,3,5,6-tetrafluoroterephthalonitrile (TFTPN), potassium carbonate ($K_2CO_3$), and dimethylformamide (DMF).

The organic solvent may include one or more selected from the group consisting of tetrahydrofuran, isopropyl alcohol, and N-propyl alcohol.

According to various exemplary embodiments of the present invention, an electrode for a fuel cell having improved oxygen permeability can be obtained.

Preferably, a polymer of intrinsic microporosity with adjusted the molecular weight and structure may be added to an ionomer, such that the crystallinity of a binder may be reduced at the microstructure level. Therefore, as the free volume of the binder may increase, the oxygen permeability of the electrode for a fuel cell may be improved, and ultimately, the use of an expensive catalyst such as platinum may be reduced.

In further aspects, vehicles are provided such as an automobile or truck that comprises an electrode, fuel cell and/or assembly as disclosed herein.

Other aspects of the invention are disclosed infra.

DETAILED DESCRIPTION

Figure 1:
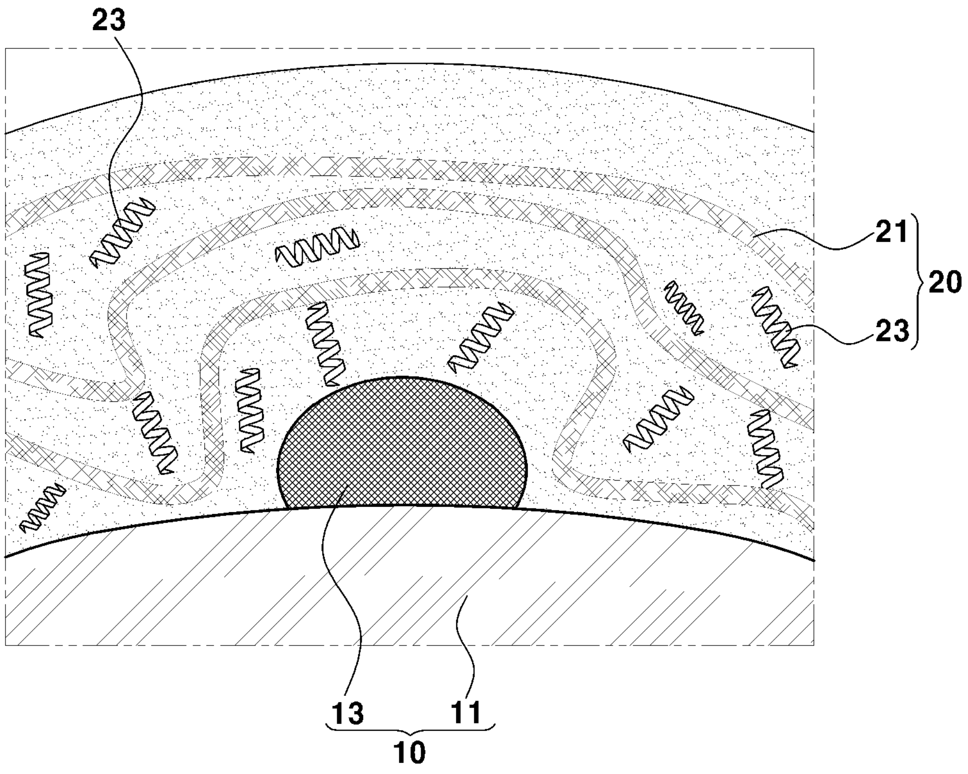
FIG. 1 shows an electrode for a fuel cell according to an exemplary embodiment of the present invention.

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated. When a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

FIG. 1 shows a portion of an exemplary electrode for a fuel cell according to an exemplary embodiment of the present invention. Preferably, the electrode may include catalyst particles 10 and a binder 20 in which the catalyst particles 10 may be dispersed.

The catalyst particles 10 may include a catalyst metal 13 which is supported on a support 11.

The catalyst metal 13 may include one or more selected from the group consisting of platinum, palladium, cobalt, gold, ruthenium, tin, molybdenum, rhodium, iridium, bismuth, copper, yttrium and chromium, and preferably may include platinum and an alloy thereof.

The support 11 may include a carbon-based support, and the carbon-based support may include one or more selected from the group consisting of graphite, carbon black, acetylene black, Denka black, Ketjen black, activated carbon, mesoporous carbon, carbon nanotubes, carbon nanofibers, carbon nanohorns, carbon nanorings, carbon nanowires, fullerene (C60), and Super P.

The binder 20 may include an ionomer 21 having proton conductivity and a polymer of intrinsic microporosity (PIM).

The ionomer 21 may include a perfluorinated sulfonic acid polymer, and preferably Nafion.

Preferably, a polymer of intrinsic microporosity (PIM) 23 may have an oligomeric spiral structure so as to serve as an effective microporosity-inducing material (organic cage (OC)).

The polymer of intrinsic microporosity is typically characterized as having repeat units of dibenzodioxane-based ladder-type structures combined with sites of contortion, which may be those having spiro-centers or severe steric hindrance.

The polymer of intrinsic microporosity having a high molecular weight may not be compatible with a perfluorinated sulfonic acid polymer such as Nafion, so it cannot be mixed therewith. Preferably, a polymer of intrinsic microporosity having a low molecular weight may be synthesized and used as an additive to the binder of an electrode for a fuel cell.

When the polymer of intrinsic microporosity, the molecular weight and structure of which are adjusted, is added to the ionomer, the crystallinity of the binder may be reduced at the microstructure level. Thereby, the free volume of the binder may increase, so the oxygen permeability of the electrode for a fuel cell is improved.

The polymer of intrinsic microporosity 23 may have a weight average molecular weight of about 5,000 g/mol or less, or about 3,000 g/mol or less. When the weight average molecular weight thereof is greater than about 5,000 g/mol, the compatibility with the ionomer 21 may decrease, making it difficult to form a membrane. The lower limit of the weight average molecular weight of the polymer of intrinsic microporosity 23 is not particularly limited, but may be about 1,000 g/mol, about 500 g/mol, or about 100 g/mol.

The polymer of intrinsic microporosity 23 may be represented by Chemical Formula 1 below.

[Chemical Formula 1]
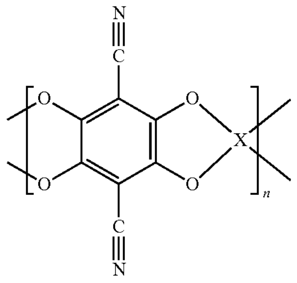
Each X may independently be selected from:
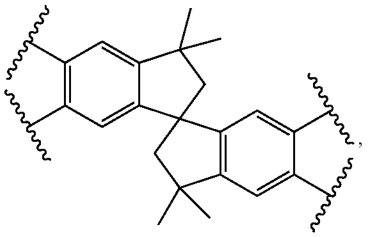
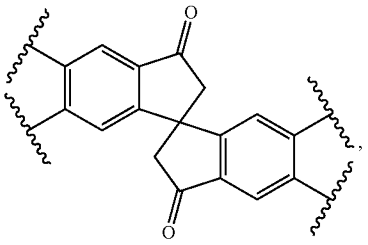
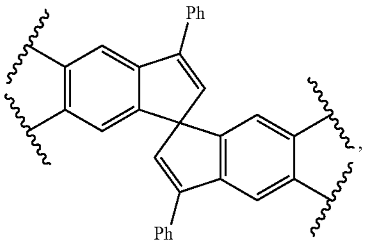
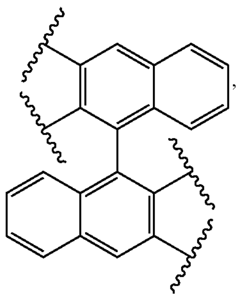
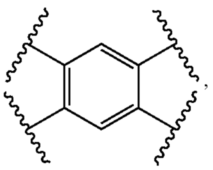
-continued
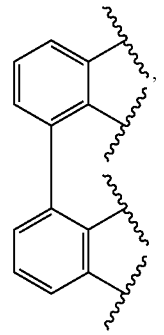
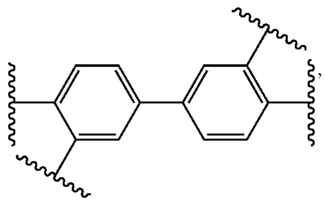
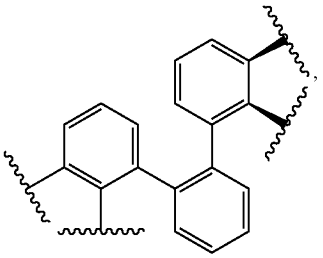
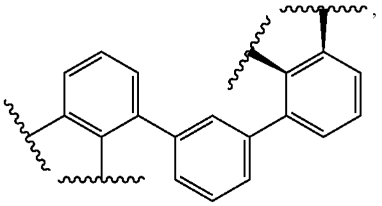
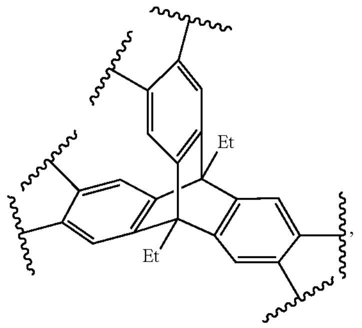
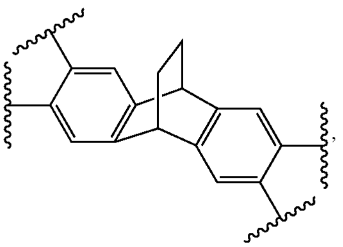
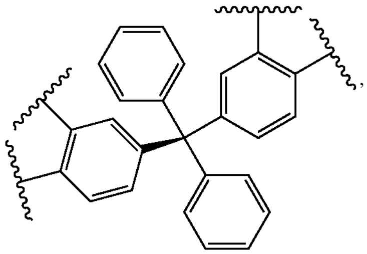

-continued
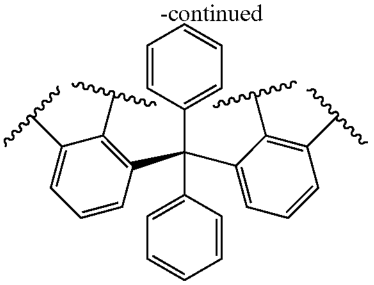
and
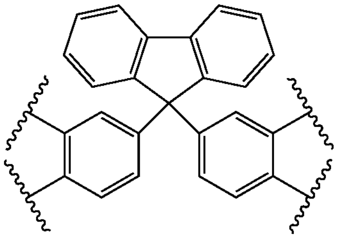
,
and n may be an integer of 1 to 10, or an integer of 6 to 7.
The polymer of intrinsic microporosity 23 may be prepared through condensation of a monomer A and a monomer B.
The monomer A may be represented by Chemical Formula 2 below.
[Chemical Formula 2]
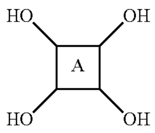
Each A may independently be selected from:
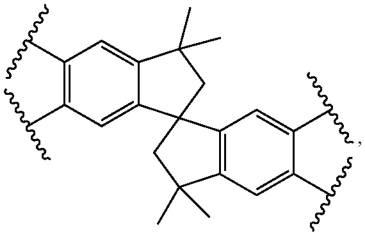
,
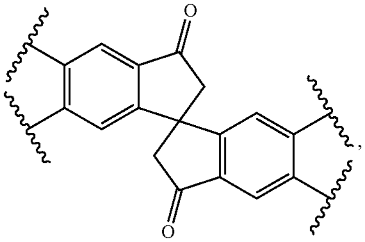
,
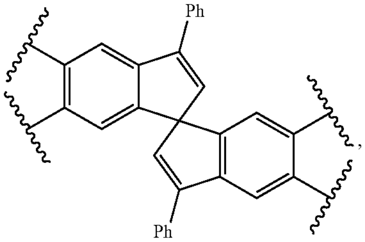
,
-continued
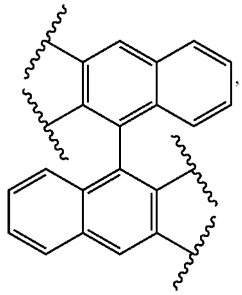
,
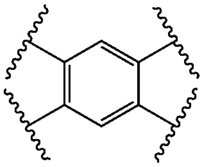
,
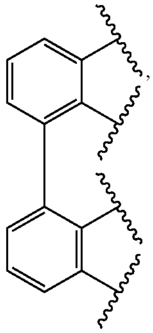
,
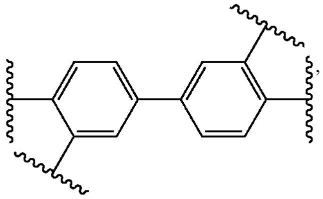
,
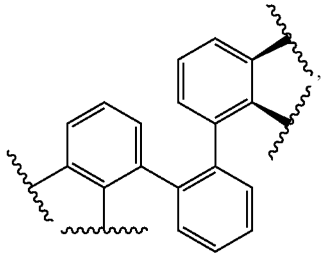
,
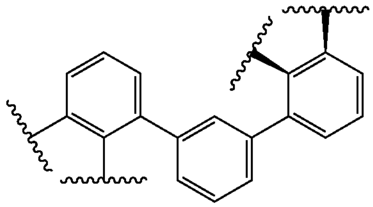
,
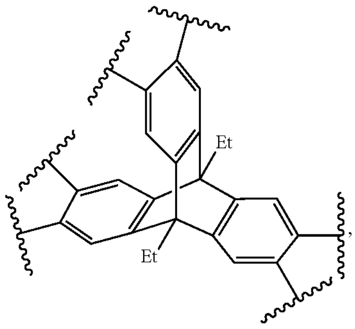
,
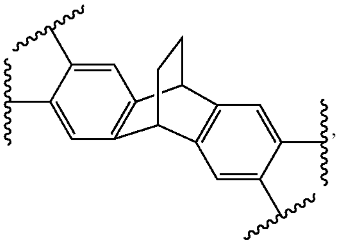
, -continued

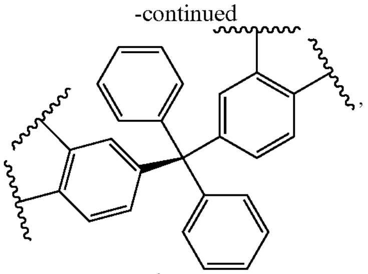

,

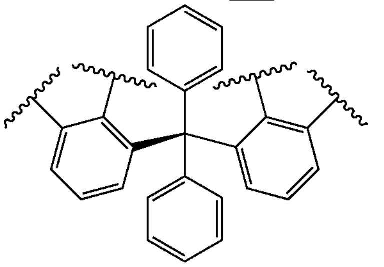

and

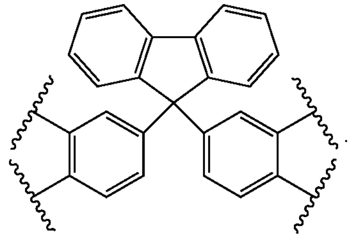

.

The monomer B may be represented by Chemical Formula 3 below.

[Chemical Formula 3]

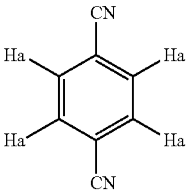

Each Ha may each independently be F, Cl, Br and I.

The condensation of the monomer A and the monomer B may be performed through a conventionally known process, and is not particularly limited.

The binder may include an amount of about 1 wt % to 20 wt % of the polymer of intrinsic microporosity, based on the total weight of the binder. When the amount of the polymer of intrinsic microporosity is less than about 1 wt %, the effect of addition thereof may become insignificant. On the other hand, when the amount thereof is greater than about 20 wt %, the crystallinity of the binder may be extremely low, and thus the proton conductivity may deteriorate.

Figure 2:
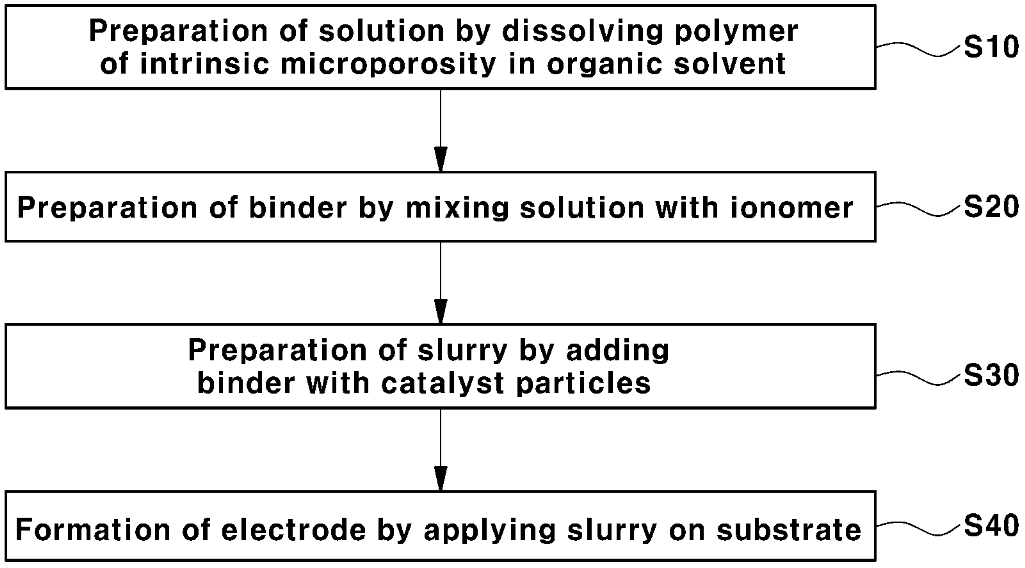
FIG. 2 shows an exemplary process of manufacturing an exemplary electrode for a fuel cell according to an exemplary embodiment of the present invention.

FIG. 2 is a flowchart schematically showing an exemplary process of manufacturing an exemplary electrode for a fuel cell according to an exemplary embodiment of the present invention. Preferably, the method may include preparing an admixture including a polymer of intrinsic microporosity and an organic solvent, for example, by dissolving a polymer of intrinsic microporosity in an organic solvent (S10), preparing a binder including the admixture and an ionomer (S20), for example, by mixing thereof, preparing a slurry including the binder and catalyst particles (S30), and forming an electrode by applying the slurry on a substrate (S40).

As the component of the binder, the polymer of intrinsic microporosity having a controlled molecular weight and structure may be added in the state of being dissolved in an organic solvent, thus increasing the compatibility of the ionomer and the polymer of intrinsic microporosity. When the polymer of intrinsic microporosity is added in a pure state, phase separation may occur and thus a membrane may not be formed.

Therefore, a solution may be prepared by dissolving the polymer of intrinsic microporosity in the organic solvent (S10), after which the solution may be mixed with an ionomer to afford a binder (S20).

The organic solvent is not particularly limited, but may include one or more selected from the group consisting of tetrahydrofuran, isopropyl alcohol, and N-propyl alcohol.

A slurry may be prepared by adding the catalyst particles to the binder (S30), after which the slurry may be applied onto a substrate such as a release paper or the like to thus form an electrode (S40).

The method may further include performing drying and/or heat treatment after applying the slurry on the substrate. The drying and/or heat-treatment conditions are not particularly limited, and may be appropriately performed under conditions that do not damage the electrode.

Figure 3:
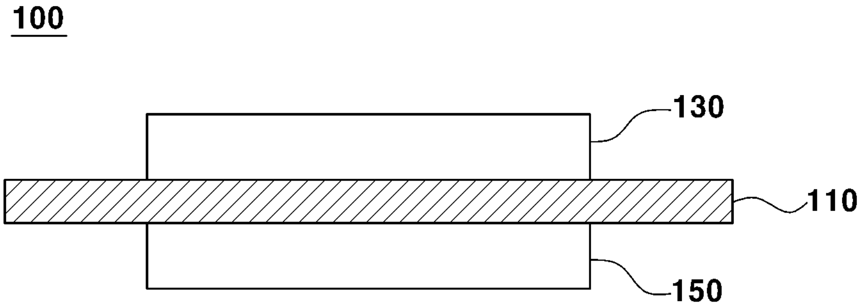
FIG. 3 shows an exemplary membrane-electrode assembly according to an exemplary embodiment of the present invention.

FIG. 3 shows an exemplary membrane-electrode assembly according to an exemplary embodiment of the present invention. The membrane-electrode assembly 100 may include an electrolyte membrane 110, a cathode 130 formed on one side of the electrolyte membrane 110, and an anode 150 formed on the remaining side of the electrolyte membrane 110. At least one of the cathode 130 and the anode 150 may be the electrode 1 described above.

EXAMPLE

A better understanding of the present invention will be given through the following examples, which are merely set forth to illustrate the present invention but are not to be construed as limiting the scope of the present invention.

Preparation Example—Preparation of Polymer of Intrinsic Microporosity Having Low Molecular Weight A polymer of intrinsic microporosity having a low molecular weight, particularly a weight average molecular weight of about 3,000 g/mol, was prepared through the following reaction.

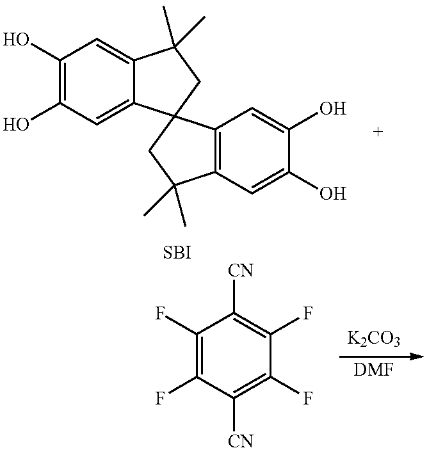

SBI

TFTPN

-continued

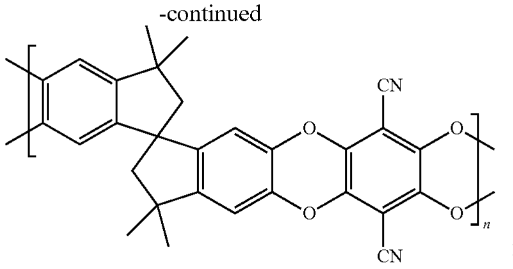

n = 7

In order to synthesize a polymer of intrinsic microporosity in which the repeating unit is n=7, the molar ratio of monomer A and monomer B was calculated using the Carothers equation, shown as Equation 1 below.

$$\overline{X_n} = \frac{1+r}{1+r-2rp} \quad \text{[Equation 1]}$$

Here, $X_n$ is a polymerization degree, p is a yield, and r is a monomer molar ratio.

For a yield of 100% (p=1), r was 0.75, so the molar ratio of monomer A and monomer B (monomer A/monomer B) was set to 0.75. In particular, 1.0874 g of SBI (5,5',6,6'-tetrahydroxy-3,3,3',3'-tetramethylspirobisindane), 0.852 g of TFTPN (2,3,5,6-tetrafluoroterephthalonitrile), and 0.882 g of $K_2CO_3$ (potassium carbonate) were added to 20 ml of DMF (dimethylformamide), available from Sigma-Aldrich, and stirred at a temperature of about 55° C. for about 12 hr, thus obtaining a polymer of intrinsic microporosity having a low molecular weight.

Figure 4A:
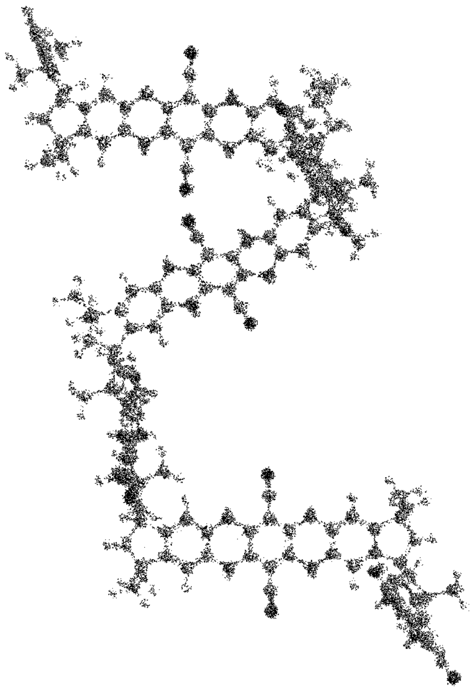
FIG. 4A shows an exemplary three-dimensional structure of an exemplary polymer of intrinsic microporosity (n is 7) according to an exemplary embodiment of the present invention.
Figure 4B:
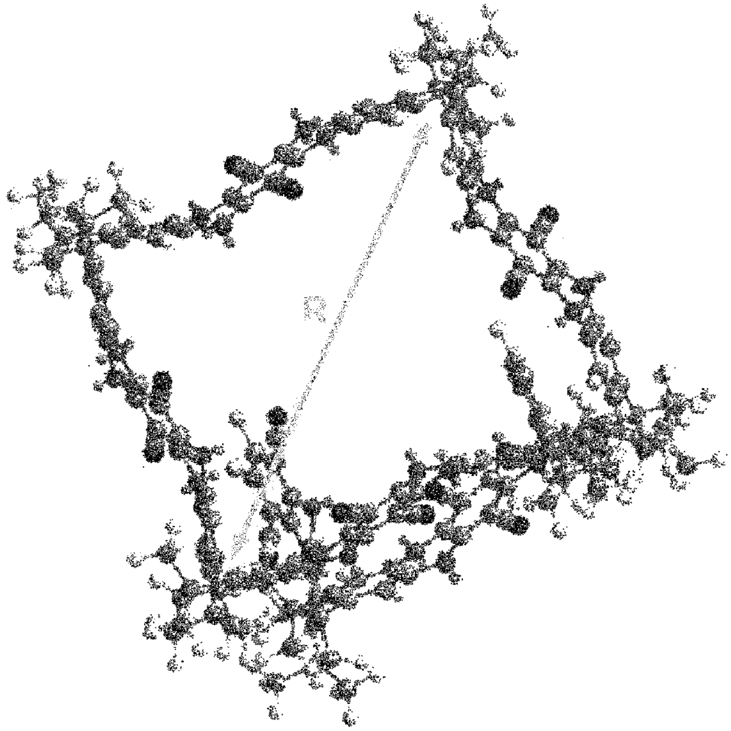
FIG. 4B shows a top plan view showing an exemplary three-dimensional structure of an exemplary polymer of intrinsic microporosity (n is 7) according to an exemplary embodiment of the present invention.

FIG. 4A is a side view showing the three-dimensional structure of the polymer of intrinsic microporosity in which n is 7, and FIG. 4B is a top plan view showing the three-dimensional structure of the polymer of intrinsic microporosity in which n is 7. The polymer of intrinsic microporosity having a spiral structure and the diameter (R) of the micropores of the spiral structure of 1.5 nm to 2 nm was obtained.

Examples 1 to 5

The polymer of intrinsic microporosity obtained in Preparation Example was dissolved in tetrahydrofuran (THF) as an organic solvent, and was then mixed with a Nafion solution as an ionomer.

The mixed solution thus obtained was applied on a substrate, dried, and heat-treated to afford a film-type membrane. In these Examples, catalyst particles were not added in order to ensure accurate measurement and comparison of oxygen permeability.

The amount of the polymer of intrinsic microporosity in the membrane was 1 wt % (Example 1), 3 wt % (Example 2), 5 wt % (Example 3), 10 wt % (Example 4) and 20 wt % (Example 5) based on the total weight of the binder.

Comparative Example 1

A film-type membrane was formed using a Nafion solution alone, without the addition of the polymer of intrinsic microporosity.

Comparative Example 2

A film-type membrane was manufactured in the same manner as in the above Examples, with the exception that an amount of 1 wt % of a polymer of intrinsic microporosity having a weight average molecular weight of 100,000 g/mol based on the total weight of the binder was included.

Comparative Example 3

A film-type membrane was manufactured in the same manner as in the above Examples, with the exception that the polymer of intrinsic microporosity of Preparation Example was added in a pure state without being dissolved in an organic solvent. The amount of the polymer of intrinsic microporosity in the membrane was 5 wt % based on the total weight of the binder.

Test Example 1—Optical Microscopy

Figure 5:
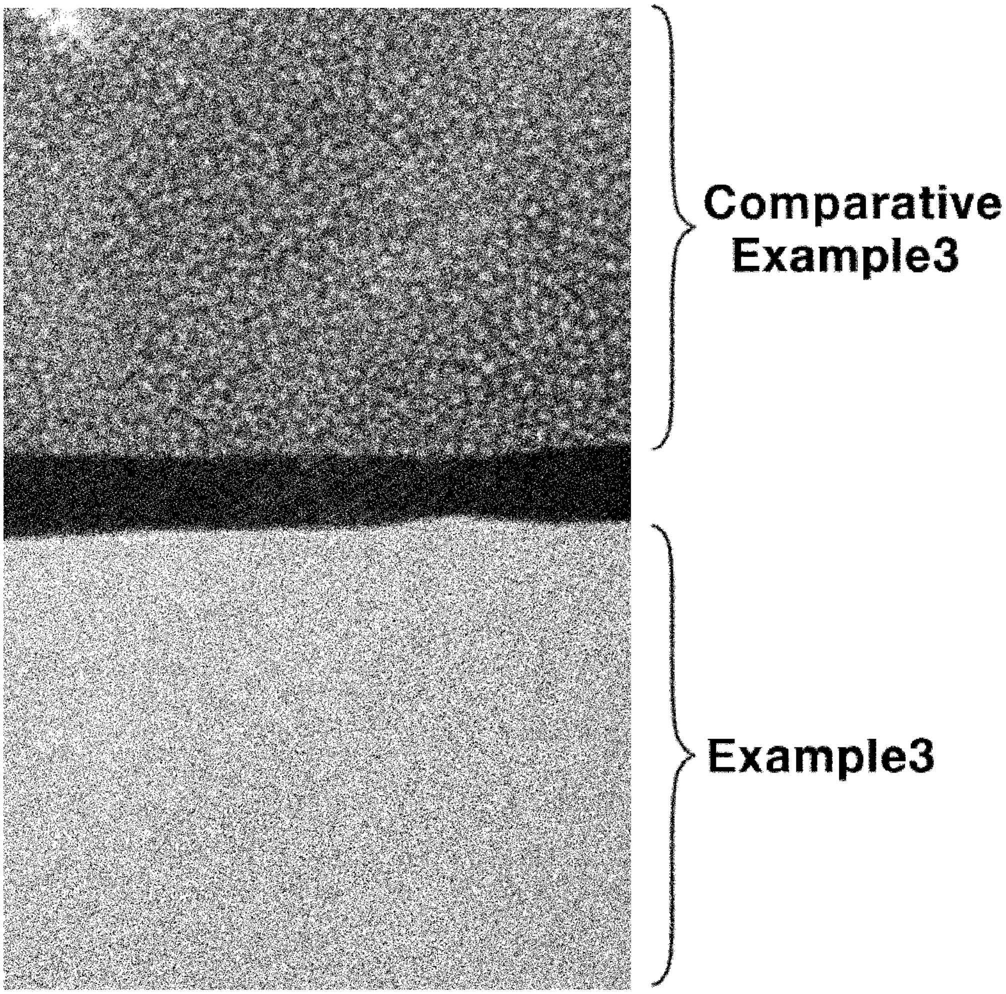
FIG. 5 shows optical microscope images of the membranes of Example 3 according to an exemplary embodiment of the present invention and Comparative Example 3.

The membranes of Example 3 and Comparative Example 3 were observed using an optical microscope. The results thereof are shown in FIG. 5. A uniform membrane was formed in Example 3, and in Comparative Example 3, the membrane was not properly formed due to phase separation.

Test Example 2—XRD Analysis

Figure 6:
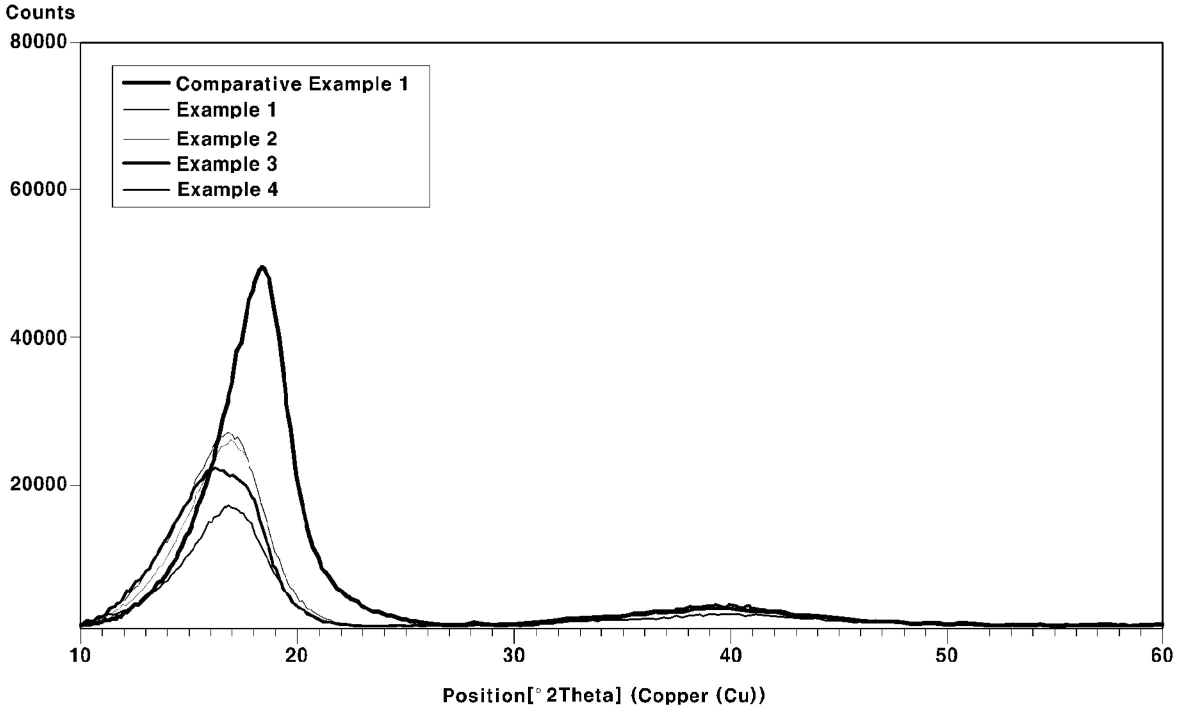
FIG. 6 shows the results of XRD (X-ray diffraction) of the membranes of Example 1 to Example 4 according to an exemplary embodiment of the present invention and Comparative Example 1.

The membranes of Example 1 to Example 4 and Comparative Example 1 were analyzed through XRD (X-ray diffraction). The results thereof are shown in FIG. 6.

In Comparative Example 1, two peaks were observed at 2θ=18.3° and 39.5°. The main peak at 2θ=18.3° shows the crystalline scattering of PTFE (polytetrafluoroethylene) as the fluorine compound.

In Example 1 to Example 4, the peak was shifted to 2θ=16.8°, indicating that the intensity decreased with an increase in the amount of the polymer of intrinsic microporosity that was added. The crystallinity of Nafion decreased with the addition of the polymer of intrinsic microporosity, which means that a microstructure capable of increasing the mass transfer phenomenon was formed by reducing the material permeation resistance due to the crystallinity of the polymer.

Test Example 3—Evaluation of Oxygen Permeability

In order to quantify oxygen permeability, a time-lag device (ASTM Method D1434-82) was used. A vacuum chamber device capable of measuring the permeability coefficient (Po) and diffusion coefficient (D) of a gas permeating a polymer film in a steady state was used. The results of evaluation of oxygen permeability of a film having a thickness of 20 μm and an effective area of 2.25 $cm^2$ at a temperature of 25° C. under dry conditions are shown in Table 1 below.

TABLE 1

| Classification | Binder composition | Oxygen permeability [barrer][1)] |
| --- | --- | --- |
| Comparative Example 1 | Nafion w/o PIM | 0.4 |
| Comparative Example 2 | Nafion w. 1 wt % PIM (Mw. 100,000 g/mol) | No film formation due to phase separation |

TABLE 1-continued

| Classification | Binder composition | Oxygen permeability [barrer][1)] |
|---|---|---|
| Example 1 | Nafion w. 1 wt % PIM (Mw. 3,000 g/mol) | 0.6 |
| Example 2 | Nafion w. 3 wt % PIM (Mw. 3,000 g/mol) | 1.2 |
| Example 3 | Nafion w. 5 wt % PIM (Mw. 3,000 g/mol) | 3.8 |
| Example 4 | Nafion w. 10 wt % PIM (Mw. 3,000 g/mol) | 36 |
| Example 5 | Nafion w. 20 wt % PIM (Mw. 3,000 g/mol) | 17 |

[1)]1 [barrer] = 1 × $10^{-10}$ cm · $cm^3/(cm^2 \cdot s \cdot cmHg)$; STP 273K, 1 atm)

Comparative Example 1 not using the polymer of intrinsic microporosity exhibited oxygen permeability of 0.4 barrer, and Comparative Example 2 using a typical polymer of intrinsic microporosity having a high molecular weight (weight average molecular weight: 100,000 g/mol) did not form a film-type membrane due to phase separation.

In all of the Examples, oxygen permeability was improved compared to Comparative Example 1. In particular, in Example 4, using 10 wt % of the polymer of intrinsic microporosity based on the total weight of the binder, oxygen permeability was increased about 90 times or greater compared to Comparative Example 1.

The present invention has been described in detail herein above with respect to test examples and various exemplary embodiments. However, the scope of the present invention is not limited to the aforementioned test examples and examples, and various modifications and improved modes of the present invention using the basic concept of the present invention defined in the accompanying claims are also incorporated in the scope of the present invention.

What is claimed is:

1. An electrode for a fuel cell, comprising:
catalyst particles; and
a binder in which the catalyst particles are dispersed,
wherein the binder comprises an ionomer and a polymer of intrinsic microporosity (PIM),
wherein the polymer of intrinsic microporosity has a weight average molecular weight of about 100 g/mol to 3,000 g/mol.

2. The electrode of claim 1, wherein the catalyst particles comprise a catalyst metal supported on a support.

3. The electrode of claim 1, wherein the ionomer comprises a perfluorinated sulfonic acid polymer.

4. The electrode of claim 1, wherein the polymer of intrinsic microporosity has a shape of a spiral structure.

5. The electrode of claim 1, wherein the polymer of intrinsic microporosity is represented by Chemical Formula 1 below:

[Chemical Formula 1]

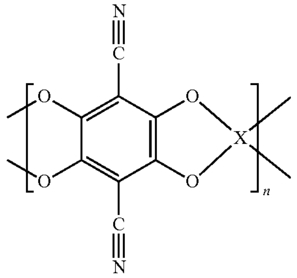

wherein each X is independently selected from:

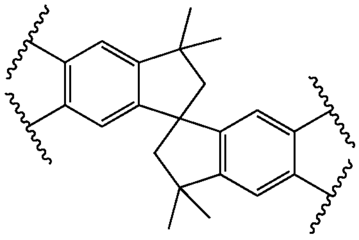
,

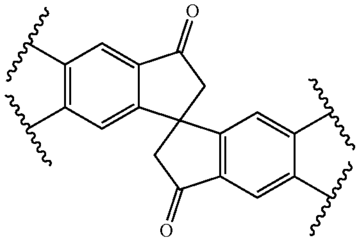
,

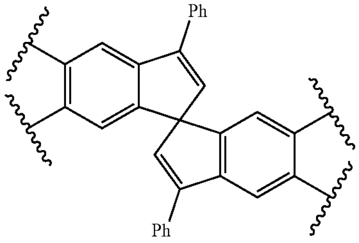
,

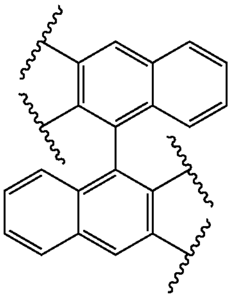
,
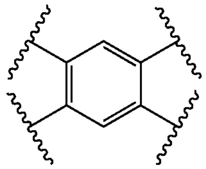
,

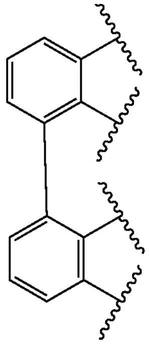
,
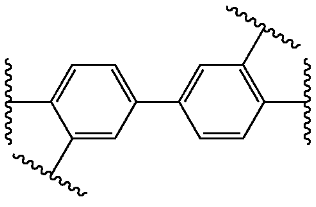
,

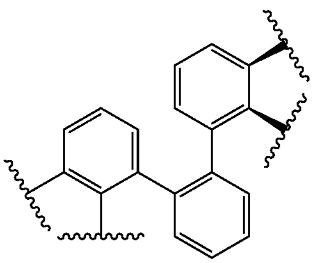
,

-continued

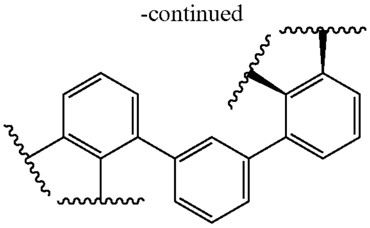

,

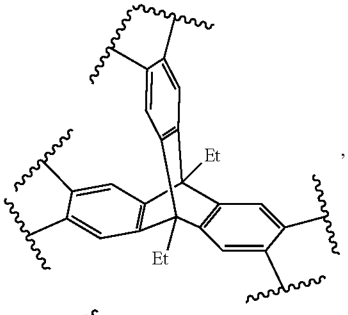

,

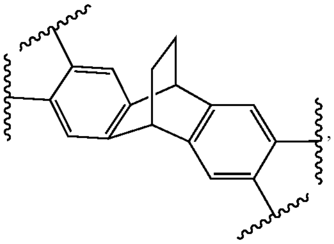

,

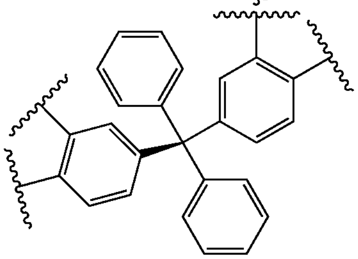

,

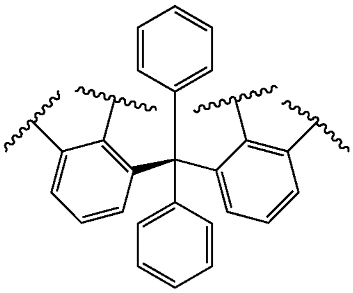

and

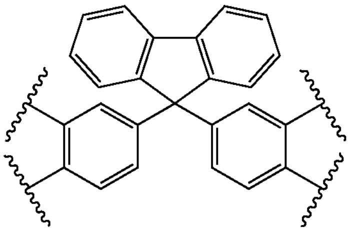

, and n is a positive integer.

6. The electrode of claim 1, wherein the binder comprises an amount of about 1 wt % to 20 wt % of the polymer of intrinsic microporosity based on the total weight of the binder.

7. The electrode of claim 1, having an oxygen permeability of about 0.6 barrer to 36 barrer.

8. A membrane-electrode assembly, comprising:

an electrolyte membrane;

a cathode formed on one side of the electrolyte membrane; and an anode formed on a remaining side of the electrolyte membrane, at least one of the cathode and the anode comprising the electrode of claim 1.

9. A vehicle comprising the membrane-electrode assembly of claim 8.

10. A method of manufacturing the electrode for a fuel cell of claim 1, comprising:

preparing the polymer of intrinsic microporosity;

preparing an admixture comprising the polymer of intrinsic microporosity and an organic solvent;

preparing the binder comprising the admixture with an ionomer;

preparing a slurry comprising the binder and catalyst particles; and forming the electrode by applying the slurry on a substrate.

11. The method of claim 10, wherein the polymer of intrinsic microporosity is prepared through condensation of a monomer A represented by Chemical Formula 2 below and a monomer B represented by Chemical Formula 3 below:

[Chemical Formula 2]

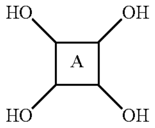

wherein each A is independently selected from:

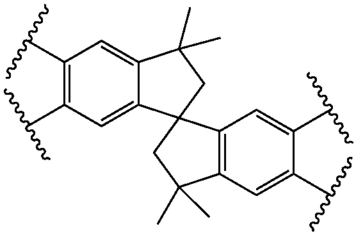

,

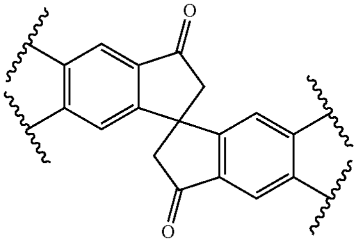

,

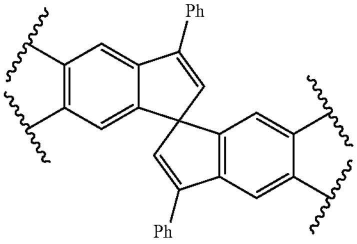

,

-continued

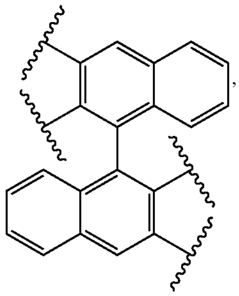
,
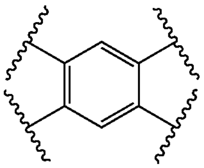
,

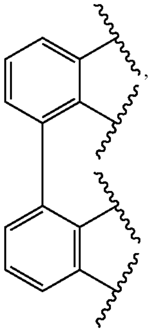
,
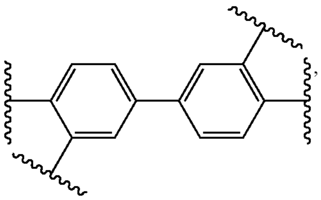
,

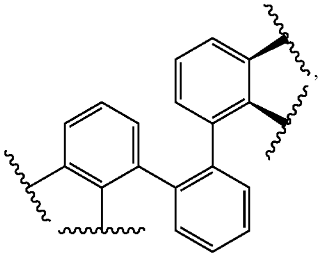
,

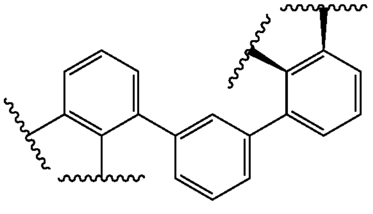
,

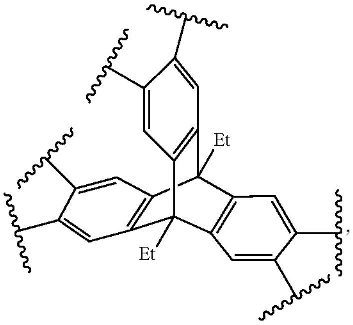
,

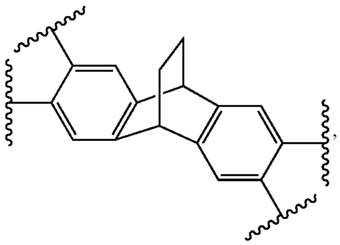
,

-continued

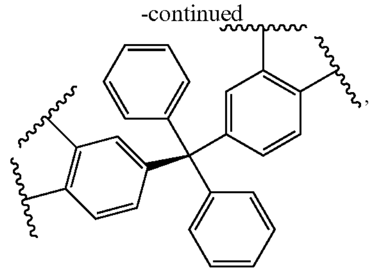
,

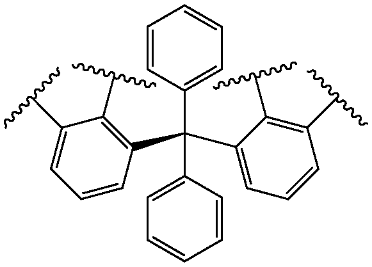
and

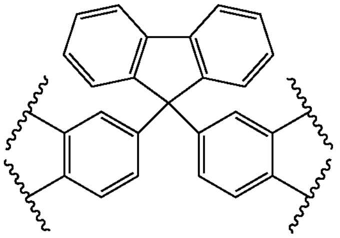
; and

[Chemical Formula 3]

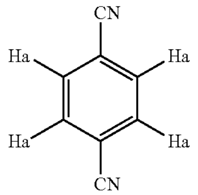

wherein each Ha is independently F, Cl, Br, or I.

12. The method of claim 10, wherein the polymer of intrinsic microporosity comprises 5,5',6,6'-tetrahydroxy-3,3,3',3'-tetramethylspirobisindane (SBI), 2,3,5,6-tetrafluoroterephthalonitrile (TFTPN), potassium carbonate ($K_2CO_3$), and dimethylformamide (DMF).

13. The method of claim 10, wherein the organic solvent comprises one or more selected from the group consisting of tetrahydrofuran, isopropyl alcohol, and N-propyl alcohol.

14. The method of claim 10, wherein the catalyst particles comprises a catalyst metal supported on a support.

15. The method of claim 10, wherein the ionomer comprises a perfluorinated sulfonic acid polymer.

16. The method of claim 10, wherein the polymer of intrinsic microporosity has a shape of a spiral structure, and is represented by Chemical Formula 1 below:

[Chemical Formula 1]
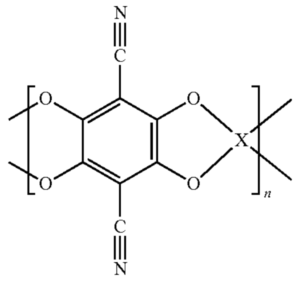
wherein each X is independently selected from:
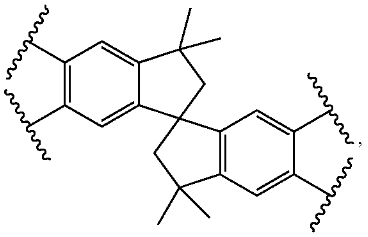
,
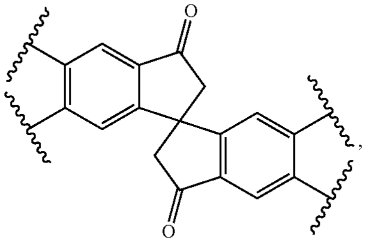
,
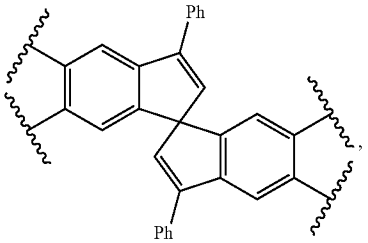
,
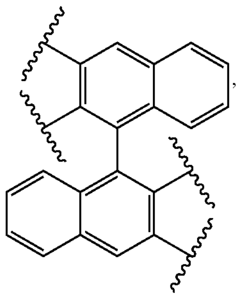
,
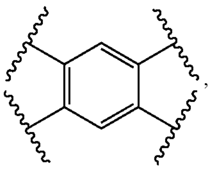
,
-continued
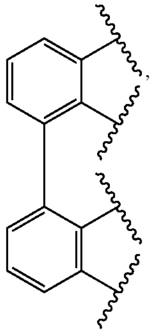
,
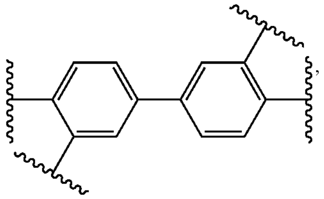
,
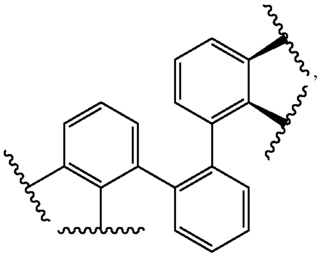
,
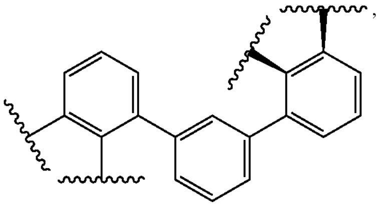
,
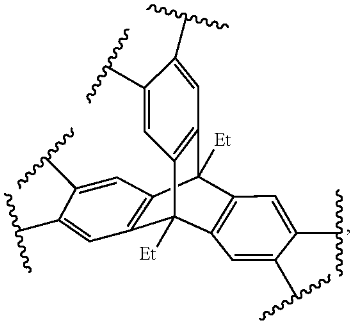
,
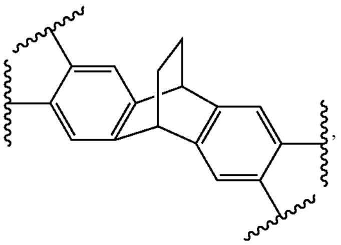
,
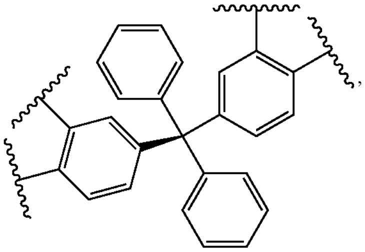
, -continued
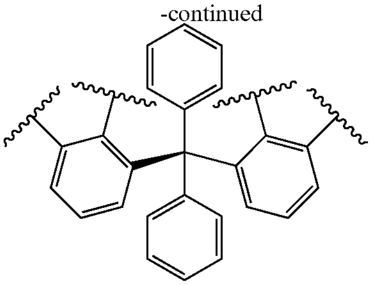
and
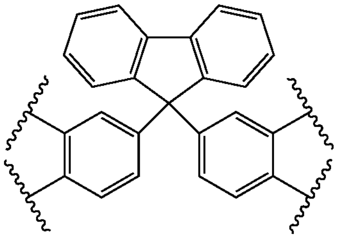
,
and
n is an integer of 1 to 10.
17. The method of claim 10, wherein the binder comprises an amount of about 1 wt % to 20 wt % of the polymer of intrinsic microporosity based on the total weight of the binder.
* * * * *